United States Patent Office 2,848,345
Patented Aug. 19, 1958

2,848,345

PARAFFIN WAX STABILIZED WITH A 2,4,5, TRIHYDROXYPHENYL KETONE

Alan Bell, M. B. Knowles, and Clarence E. Tholstrup, Kingsport, Tenn., assignors to Eastman Kodak Company, Rochester, N. Y., a corporation of New Jersey No Drawing. Application July 2, 1954
Serial No. 441,153

6 Claims. (Cl. 106—270)

This application is a continuation-in-part of our application Serial No. 302,412, filed August 2, 1952, now U. S. Patent 2,759,828, issued August 21, 1956, which covers the stabilization of fats, oils, etc. with some of the compounds disclosed herein and some other compounds.

This invention relates to novel compounds for the stabilization of fats, oils and other organic materials subject to deterioration, e. g. paraffin wax, etc. These compounds are —CO—R derivatives of 1,2,4-trihydroxybenzene wherein R is defined below.

The object of our invention is to provide a paraffin wax stabilized with a 2,4,5, trihydroxyphenyl ketone which is particularly useful in the stabilization of fats and oils.

In accordance with our invention, novel compounds are provided which consist of those selected from the group having the following formula:

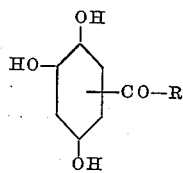

which can probably be more specifically written as follows:

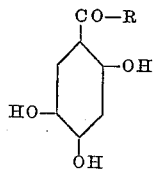

wherein R represents a member selected from the group consisting of an alkyl radical containing from 2 to 20 carbon atoms, a cycloalkyl radical containing from 6 to 10 carbon atoms, an alkenyl radical containing from 2 to 10 carbon atoms, an aralkyl radical containing from 7 to 20 carbon atoms and a furyl radical. The position of the substituent —CO—R on the benzene ring appears to be that shown in the second formula. The names of the various novel compounds will be based on that assumption. Of course it is obvious that the processes for producing these compounds result in the formation of small amounts of isomers other than those covered by the second formula given above.

Examples of compounds which come within the scope of the above formula include 2,4,5-trihydroxybutyrophenone, 2,4,5-trihydroxyvalerophenone, 2,4,5-trihydroxyphenyl furyl ketone, 2,4,5-trihydroxy-α-ethylbutyrophenone, 2,4,5-trihydroxycaprophenone, 2,4,5-trihydroxy-α-ethylcaprophenone, 2,4,5-trihydroxyphenyl omega-phenyl-n-decyl ketone, 2,4,5-trihydroxyphenyl octyl ketone, 2,4,5-trihydroxyphenyl propenyl ketone, 2,4,5-trihydroxyphenyl allyl ketone, 2,4,5-trihydroxy-α-phenylacetophenone, 2,4,5-trihydroxyphenyl cyclohexyl ketone, etc. Some of those compounds which can be advantageously employed are set forth in the tables presented hereinbelow relating to the antioxidant properties of such compounds.

It is known that 1,2,4-trihydroxybenzene can be employed for the stabilization of fats and vegetable oils. There is no suggestion, however, in the prior art that derivatives of this compound would also be useful as antioxidants for fats, vegetable oils and other organic materials subject to deterioration. The introduction of the group, —CO—R (wherein R is defined above) on the benzene ring of 1,2,4-trihydroxybenzene has been found to result in the formation of compounds which have excellent antioxidant properties. This was wholly unexpected and unpredictable especially since the introduction of —CO—R substituents on the nucleus of hydroquinone gives compounds with very little antioxidant value. The following table presents data relating to the effect of the introduction on the nucleus of hydroquinone of a —CO—R radical wherein the radical substituted is —CO(CH$_2$)$_2$CH$_3$. This data is based on tests conducted under the active oxygen method (AOM) which is described in the parent application mentioned above.

These tests were conducted employing lard as the substrate which had an AOM value of 4 hours (lard A) and 12.5 hours (lard B) when it contained no antioxidant. The concentration in each instance was 0.02 percent by weight of the antioxidant in the lard.

| Antioxidant | AOM Value in Hours | |
|---|---|---|
| | Lard A | Lard B |
| Control (no antioxidant) | 4.0 | 12.5 |
| Hydroquinone | 118.0 | 130.0 |
| 1,2,4-Trihydroxybenzene | | 135.0 |
| 2,5-Dihydroxybutyrophenone | 11 | |
| 2,4,5-Trihydroxybutyrophenone | | 160.0 |

The difference between the dihydroxy and the trihydroxy derivatives containing a —CO—R radical is clearly evident, as indicated by the above table.

The introduction of the —CO—R substituent on to the nucleus of 1,2,4-trihydroxybenzene gives products which have many advantages as antioxidants over 1,2,4-trihydroxybenzene itself. Thus the compounds of antioxidant value described in this invention are stable to air, are less water-soluble and more fat-soluble.

If R were a methyl radical in the above formula the compound 2,4,5-trihydroxyacetophenone would not be as satisfactory in several important respects as are the compounds covered by the above formula in which R contains 2 or more carbon atoms. One of the problems which is quite important in regard to the use of phenolic type antioxidants in edible fats and oils is the discoloration that often develops when the stabilized product is in contact with iron and water. When R is methyl, discoloration develops quite rapidly and becomes very intense. When R contains two or more carbon atoms the color formation is less significant and disappears as the number of carbon atoms becomes greater. Thus 2,4,5-trihydroxy butyrophenone is satisfactory for use whereas 2,4,5-trihydroxyacetophenone develops very bad color formation. For this reason, 2,4,5-trihydroxyacetophenone is not satisfactory for use commercially as an antioxidant for edible fats and oils where the presence of an acceptable color is important. There is another important property in which 2, 4, 5-trihydroxyacetophenone is inferior to the higher homologs. In frying tests, fats stabilized with 2,4,5-trihydroxyacetophenone darkened more intensely and more quickly than the higher homologs. This property is also objectionable fom a commercial standpoint.

The compounds described as antioxidants in accordance with our invention can also be advantageously employed for the stabilization of other organic compounds subject to deterioration in addition to fats and oils, e. g. gasoline, lubricating compositions, transformer oil, fuel oil, carotene containing materials, plastic compositions, paraffin wax, tallows, suet, vitamins, essential oils such as citrus oils, polymeric materials such as polyethylene, cellulose esters, polyesters, etc.

The advantages of the higher homologs covered by the invention as compared to 2,4,5-trihydroxyacetophenone may be summed up as follows:
 (a) Improved water and fat solubility characteristics
 (b) Improved properties in respect to color formation in the presence of iron and water
 (c) Less darkening of the stabilized fat during frying
 (d) Greater effectiveness in stabilizing paraffin wax.

The advantages of the compounds of this invention in stabilizing hot paraffin wax are illustrated by these AOM values (hours) based on the use of 0.01% of the antioxidant in paraffin wax at 150° C.; these data are based on determinations made at 50 m. eq. of peroxide:

| Compound (0.01%) | AOM Keeping Quality (Hours) | | |
| --- | --- | --- | --- |
| | Sample A, 100° C. | Sample A, 150° C. | Sample B, 150° C. |
| Control | 54 | 1.0 | 1.5 |
| Butylated hydroxyanisole (BHA) | | | 8.5 |
| Propyl gallate | 670 | 17.5 | 18.0 |
| 2,6-ditert-butyl-4-methylphenol | 135 | 5.0 | 5.5 |
| 2,4,5-Trihydroxy acetophenone | 475 | 15.0 | 15.5 |
| 2,4,5-Trihydroxy butyrophenone | >1,100 | 29.0 | 29.5 |
| 2,4,5-Trihydroxy isobutyrophenone | | 21.0 | |
| 2,4,5-Trihydroxy caprylophenone | | 26.0 | |
| 2,4,5-Trihydroxy caprophenone | | 21.0 | |
| 2,4,5-Trihydroxy laurophenone | | 23.0 | |

The above data cover a representative group from thirty compounds evaluated in a series of tests which showed 2,4,5-trihydroxybutyrophenone to be the most effective compound evaluated.

When employed as antioxidants for fats, oils, and the like, fractions of a percent of the compounds of this invention can be incorporated into such materials as lard, cottonseed oil, peanut oil, paraffin, etc., by admixing the antioxidant with the fat, oil or other substrate whereby a solution of the antioxidant in the substrate is obtained. Alternatively, the antioxidant can be blended with suitable solvents to form an antioxidant solution. Examples of such solvents include glycerin, propylene glycol, hexane, etc., or other similar solvents which are inert insofar as concerns both the antioxidant and the other components of the ultimately prepared stabilized substrate. Such antioxidant solutions can be more readily dissolved in the substrate to be stabilized with less necessity for prolonged mixing of the substrate with the undissolved antioxidant. Similarly, synergists can be admixed with the fats or oils along with the dry antioxidant compounds of this invention or, in order to facilitate the incorporation of the antioxidant and the synergist into the substrate, they can both be dissolved in such solvents as described above.

The stabilized substrates incorporating the novel compounds provided by this invention advantageously contain from about 0.001% to about 1.0% by weight of a novel compound having the structural formula set forth hereinabove. These stable products include combinations of such novel compounds with other antioxidants, e. g. isomers of tert. butyl-p-hydroxyanisole, propyl gallate, etc., some of which combinations of antioxidants may be synergistic in nature. Such products include fats and oils stabilized with from about 0.001% to about 1.0% by weight of an antioxidant defined by the depicted general formula admixed with from about 0.0005% to about 0.1% by weight of the fat, oil, or other substrate of a synergist, e. g. citric acid, tartaric acid, phosphoric acid, ascorbic acid, propyl gallate, etc.

Procedures for preparing the novel compounds of the type disclosed hereinabove as antioxidants are set forth in the examples which are given below. The procedures set forth in the following examples can be readily adapted to prepare any of the compounds included in the general formula.

The following examples will serve to illustrate advantageous processes for the preparation of antioxidant compositions coming within the scope of this invention:

*Example 1.—2,4,5-trihydroxybutyrophenone*

A Fries rearrangement was carried out with 1,2,4-tributyroxybenzene by gradually adding 26 g. (0.2 mole) of aluminum chloride to a solution of 67.2 g. (0.2 mole) of the tributyrate in 200 cc. of nitrobenzene. This mixture was left 16 hours at room temperature, poured into 150 cc. of 10 percent hydrochloric acid, and steam distilled to remove butyric acid and nitrobenzene. The residue in the pot was cooled to 5° C. and a yellow oil was extracted with ether. The ether extract was washed, dried, and then 100 cc. of methanol containing 5 g. of hydrogen chloride was added and the mixture was boiled for a few minutes. The methanol was distilled off and replaced with benzene. This was again distilled to remove the last traces of methanol. The benzene solution (150 cc.) was finally cooled and the solid which separated was recrystallized from hot water using charcoal to decolorize. The yield was 16 g. of a product which melted at 151–3° C. The calculated analysis for this compound ($C_{10}H_{12}O_4$) is C, 61.21; H, 6.16; the actual analysis showed C, 61.31; H, 6.45.

1,2,4-tributyroxybenzene which is not known to have been described in the prior art and which was employed above was prepared by a Thiele reaction. Fifty-four grams (0.5 mole) of p-quinone was added portion-wise at 40–50° C. with stirring to 210 g. (1.4 moles) of n-butyric anhydride containing 10 g. of concentrated sulfuric acid. After the addition of p-quinone was complete, the mixture was allowed to spontaneously cool to 25° C. and was then poured into water. The solution was extracted with ether. The extract was washed with water, then with dilute soduim carbonate solution, and finally with water again and distilled. The product distilled at 153–55° C. (0.08 mm.). The yield was 150 g. (90 percent).

*Example 2.—2,4,5-trihydroxybutyrophenone*

The product of Example 1 was also prepared in the following manner: Thirty-three grams (0.25 mole) of aluminum chloride was added to a solution of 12.6 g. (0.1 mole) of 1,2,4-trihydroxybenzene in 200 cc. of nitrobenzene. The mixture was cooled at 25° C. and 16 g. (0.1 mole) of n-butyric anhydride added. The reaction mixture was then heated to 60° C. for 45 minutes. After cooling, 150 cc. of ice-cooled 10 percent hydrochloric acid was added and the mixture steam distilled to remove nitrobenzene. The pot residue, on cooling, deposited 12 g. (61 percent) of pure 2,4,5-trihydroxybutyrophenone.

*Example 3.—2,4,5-trihydroxyisobutyrophenone*

A mixture of 300 ml. of nitrobenzene and 25.2 g. (0.2 mole) of 1,2,4-benzenetriol was gradually treated with 40 g. (0.3 mole) of anhydrous aluminum chloride. After evolution of hydrogen chloride ceased, the resulting solution was cooled to 25°, and 21 g. (0.2 mole) of isobutyryl chloride was added. The reaction mixture was allowed to stand for several hours and then warmed at 60–65° C. for one-half hour. After decomposing the complex with cold, dilute hydrochloric acid, the mixture was subjected to steam distillation to remove the nitrobenzene. When cooled, the residue crystallized. Recrystallization from ethylene dichloride gave a product light yellow in color and one which melted at 136–8° C. The yield was 12 g. (31%). This compound, 2,4,5-trihydroxyisobutyrophenone, is not known to have been described in the prior art.

*Example 4.—2,4,5-trihydroxycaprylophenone*

This compound was prepared as in Example 3 using 25.2 g. (0.2 mole) of 1,2,4-benzenetriol, 300 ml. of nitrobenzene, 40 g. (0.3 mole) of aluminum chloride, and 33 g. (0.2 mole) of n-caprylyl chloride. The crude product was recrystallized once from acetic acid-water and then from naphtha-butyl acetate; M. P. 113–114° C.; yield, 15 g. (30%).

*Example 5.—2,4,5-trihydroxystearophenone*

This compound was prepared as in the preceding two examples (Examples 3 and 4) using identical molar ratios of reactants. The crude product was decolorized in ethanol solution then precipitated by adding a little water. Recrystallization from carbon tetrachloride and then from methanol gave a light yellow product which melted at 118–119° C. The yield was 39.2 g. (50%).

*Example 6.—2,4,5-trihydroxycrotophenone*

This compound was prepared as in Example 3 using identical molecular proportions. The residue from steam distillation was blood red and crystallized to a mush only after standing at 10° C. for several hours. This mush was dissolved in methanol and the solution treated with charcoal; the product precipitated by the addition of water. Further purification was obtained by passing an acetone solution of the product through a short column of activated alumina (Al-0101-P). The acetone solution was concentrated and water then added caused a light brown, crystalline material to separate; M. P. 219–221° C.; yield 2 g. (5%). This compound, 2,4,5-trihydroxycrotophenone can also be called 2,4,5-trihydroxyphenyl propenyl ketone.

*Example 7.—2,4,5-trihydroxyphenyl furyl ketone*

A mixture consisting of 0.1 gram mole of 1,2,4-trihydroxybenzene, 0.12 gram mole (16 grams) of aluminum chloride and 200 cc. of nitrobenzene were warmed at about 60° C. for about 5 minutes with 0.1 gram mole of furoyl chloride. The mixture was then decomposed with ice cold dilute hydrochloric acid. After steam distillation to remove the nitrobenzene the residue was cooled and 1,2,4-trihydroxybenzene monofuroate crystallized. The monofuroate was separated from the liquid and was intimately mixed with about three times the molecular quantity of aluminum chloride and heated to about 130° C. when reaction began. Over a 30-minute period the temperature was raised to about 190° C. The mixture was cooled and decomposed with ice cold hydrochloric acid. The product M. P. 209–211° C., bright orange crystals, was obtained in 20–30% yield.

*Example 8.—2,4,5-trihydroxy-α-ethylbutyrophenone*

This compound was prepared as in Example 3 using 25.2 g. (0.2 mole) of 1,2,4-benzenetriol, 300 ml. of nitrobenzene, 40 g. (0.3 mole) of aluminum chloride and 26.9 g. (0.2 mole) of 2-ethylbutyryl chloride. The crude product was purified by crystallizing from acetic acid-water and then from benzene-hexene. A yield of 10 g. (22%) which melted at 123–4° C. was obtained.

*Example 9.—2,4,5-trihydroxy-α-ethylcaprophenone*

This compound was prepared as in the example shown above using the same molar ratios of reactants. The crude product was purified by crystallizing from benzene-hexane. A yield of 12%, which melted at 94–7° C., was obtained.

*Example 10.—2,4,5-trihydroxylaurophenone*

This compound was prepared as in the above examples. The crude product was purified by crystallizing first from acetic acid-water and then from benzene-hexane; M. P. 119–121° C.; yield 29%.

*Example 11.—2,4,5-trihydroxycapriphenone*

This compound was prepared as in the above examples. The crude product was purified by crystallizing first from naphthabutyl acetate and then from acetic acid-water. A yield of 23%, which melted at 108–111° C., was obtained.

*Example 12.—2,4,5-trihydroxy-α-phenylacetophenone*

This compound was prepared as in the above examples. The solvents used for purification were benzene-ethanol then acetic acid-water. A yield of 20%, which melted at 210–213° C., was obtained.

*Example 13.—Cyclohexyl 2,4,5-trihydroxyphenyl ketone*

This compound was prepared as in the above examples. The crude product was purified by crystallizing from benzene-methanol then from ethanol-water. A yield of 7.5%, which melted at 186–8° C., was obtained.

The above examples clearly indicate how the compounds of this invention can be prepared. By suitable modifications of the described procedures, any of the compounds coming within the scope of the above depicted formula can be similarly prepared.

The compounds prepared as described in the above examples can be employed as antioxidants in lard and in some vegetable oils. Tests according to the active oxygen method have shown the effectiveness of these antioxidants. The results of some of these tests are set forth in the following table. For comparison purposes several commercial antioxidants and other compounds are also included.

Inasmuch as it is well known in the art to employ antioxidants in the stabilization of fats, oils and other materials, it is not believed necessary to give numerous additional examples of how the antioxidants of this invention can be blended with the various organic materials nor additional specific proportions which can be employed in the many possible examples which would come within the scope of the description hereinabove. The data presented in the table below is based on tests conducted under equivalent conditions employing similar samples in each instance of lard except as indicated. Data concerning paraffin have been presented in a table above.

The procedure employed under the AOM (active oxygen method) is well known in the antioxidant art and is explained in the parent application Serial No. 302,412 referred to above.

A perusal of the data contained in the following table indicates that the novel antioxidants of this invention are, insofar as their stabilization characteristics are concerned, clearly superior in lard, paraffin, etc. to many of the antioxidants which are commercially available such as tertiary butyl-p-hydroxyanisole (BHA), propyl gallate, etc. Moreover, other properties of these antioxidants render them superior to those known to the prior art, e. g. such properties as solubility in fats, freedom from discoloration, food processing characteristics, lack of taste effects, insolubility in water, etc.

Other antioxidants coming within the scope of the above depicted general formula can be employed in a similar manner to obtain analogous advantageous results in the same or in other substrates within the scope of the preceding description of our invention.

A. O. M. DATA IN LARD

| Compound | A. O. M. Value in Hr. at 0.02% | |
|---|---|---|
| | Lard B | Lard C |
| Control | 12.5 | 11.5 |
| BHA | 32 | 31 |
| Propyl gallate | 86 | 92 |
| Cyclohexyl 2,4,5-trihydroxyphenyl ketone | 87 | |
| 2,4,5-Trihydroxy-α-phenylacetophenone | 120 | |
| α-Ethyl-2,4,5-trihydroxybutyrophenone | 75 | |
| α-Ethyl-2,4,5-trihydroxycaprophenone | 69 | |
| 2,4,5-Trihydroxycapriphenone | 106 | |
| 2,4,5-Trihydroxylaurophenone | 106 | |
| 2,4,5-Trihydroxybutyrophenone | 160 | |
| 2,4,5-Trihydroxycaprylophenone | 153 | |
| 2,4,5-Trihydroxycrotophenone | 96 | |
| 2,4,5-Trihydroxyisobutyrophenone | 167 | |
| 2,4,5-Trihydroxystearophenone | 114 | |
| 2,4,5-Trihydroxyphenyl furyl ketone | 127 | |

What we claim as our invention and desire to secure by Letters Patent of the United States is:

1. Stabilized paraffin wax which contains from about 0.001% to about one percent by weight of an improved antioxidant having the following formula:

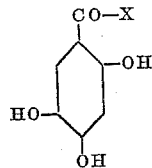

wherein X represents a member selected from the group consisting of an alkyl radical containing from 2 to 20 carbon atoms, a cycloalkyl radical containing from 6 to 10 carbon atoms, an alkenyl radical containing from 2 to 10 carbon atoms and an aralkyl radical containing from 7 to 20 carbon atoms.

2. Stabilized paraffin wax as defined in claim 1 wherein the improved antioxidant is 2,4,5-trihydroxylaurophenone.

3. Stabilized paraffin wax as defined in claim 1 wherein the improved antioxidant is 2,4,5-trihydroxyisobutyrophenone.

4. Stabilized paraffin wax as defined in claim 1 wherein the improved antioxidant is 2,4,5-trihydroxybutyrophenone.

5. Stabilized paraffin wax as defined in claim 1 wherein the improved antioxidant is 2,4,5-trihydroxyphenyl cyclohexyl ketone.

6. Stabilized paraffin wax as defined in claim 1 wherein the improved antioxidant is 2,4,5-trihydroxycaprylophenone.

References Cited in the file of this patent

UNITED STATES PATENTS

| | | |
|---|---|---|
| 2,034,024 | Clarke | Mar. 17, 1936 |
| 2,116,220 | Shoemaker | May 3, 1938 |
| 2,590,813 | Britton et al. | Mar. 25, 1952 |
| 2,636,003 | Capell et al. | Apr. 21, 1953 |
| 2,686,123 | Campbell et al. | Aug. 10, 1954 |
| 2,686,812 | Wynn et al. | Aug. 17, 1954 |
| 2,694,014 | Capell et al. | Nov. 9, 1954 |

OTHER REFERENCES

"Handbook of Plastics," Simonds and Ellis (1943), pp. 311 and 312.

Thompson: "Jour. Ind. & Eng. Chem.," 42 (1950).